United States Patent [19]

Brandenburg et al.

[11] Patent Number: 4,812,243
[45] Date of Patent: Mar. 14, 1989

[54] PROCESS FOR TREATING CAUSTIC CYANIDE METAL WASTES

[75] Inventors: Bruce L. Brandenburg, Rib Mountain; Curtis D. Cooley, Rothschild, both of Wis.; Claude E. Ellis, Walnut, Calif.

[73] Assignee: Zimpro/Passavant Inc., Rothschild, Wis.

[21] Appl. No.: 254,070

[22] Filed: Oct. 6, 1988

[51] Int. Cl.$^4$ .......................... C02F 1/74; C02F 11/08
[52] U.S. Cl. .................................. 210/761; 210/904; 134/3; 134/41
[58] Field of Search ............... 210/696, 742, 761, 762, 210/766, 774, 904, 912; 422/14; 134/3, 28, 41

[56] References Cited

U.S. PATENT DOCUMENTS

| | | | |
|---|---|---|---|
| 3,849,536 | 11/1974 | Morgan | 423/206 |
| 3,917,460 | 11/1975 | Morgan | 422/193 |
| 4,059,514 | 11/1977 | Jahnsen | 210/904 X |
| 4,070,281 | 1/1978 | Tagashira et al. | 210/904 X |
| 4,108,680 | 8/1978 | Barr | 134/3 |
| 4,174,280 | 11/1979 | Pradt et al. | 210/761 X |
| 4,350,599 | 9/1982 | Chowdhury | 210/761 |
| 4,402,837 | 9/1983 | Okagawa | 210/758 |
| 4,525,283 | 6/1985 | Horak et al. | 210/762 |
| 4,692,252 | 9/1987 | Atwood et al. | 210/761 |
| 4,704,235 | 11/1987 | Arvsen | 134/3 X |
| 4,713,177 | 12/1987 | Atwood et al. | 210/761 X |

Primary Examiner—Tom Wyse
Attorney, Agent, or Firm—Tipton L. Randall

[57] ABSTRACT

A method for operating a continuous wet oxidation system for destroying cyanide in caustic cyanide and metal wastes which scale upon heating. Raw waste is introduced into the wet oxidation reactor without heating while a mixture of heated dilution water and oxygen containing gas is introduced into the reactor by a separate inlet. The reactor is fitted with a pair of valved effluent lines and corresponding valved lines for introducing dilute mineral acid into each effluent line at system pressure. Oxidized effluent and offgases exit through a first effluent line while dilute mineral acid flows through a second effluent line into the reactor to prevent scale buildup. Periodically the flows are alternated such that oxidized effluent and offgases exit through the second effluent line and dilute mineral acid flows through the first effluent line into the reactor to remove scale. The oxidized effluent and offgases are then cooled and separated.

13 Claims, 4 Drawing Sheets

PROCESS FOR TREATING CAUSTIC CYANIDE METAL WASTES

BACKGROUND OF THE INVENTION

I. Field of the Invention

This invention relates to a process for treating caustic cyanide and metal containing wastes which have a tendency to form an insoluble scale on heating.

II. Description of Related Art

Caustic cyanide wastes containing metals are generated by the metal plating industry. The wastes are hazardous for both their cyanide and metals content. These wastes have been treated by alkaline chlorination to destroy cyanide but this treatment generally results in generation of solids which still contain appreciable amounts of cyanide. See for example Jahnsen U.S. Pat. No. 4,059,514.

Wet air oxidation provides an alternative method for cyanide destruction and waste treatment. The elevated temperature and pressure oxidation provides a high degree of cyanide destruction for these wastes. The high solids content of these caustic cyanide and metal wastes gives rise to scaling problems in wet air oxidation systems which can require frequent shut down to remove scale from the system. Scaling is a problem in feed lines, within the wet oxidation reactor, and in oxidized effluent lines when these wastes are treated by wet air oxidation.

Numerous wet air oxidation flow schemes are known but none of them were judged to be applicable to the wet oxidation treatment of such caustic cyanide and metal wastes.

Morgan in U.S. Pat. No. 3,849,536 and U.S. Pat. No. 3,917,460 describe the wet oxidation of soda process pulping liquor to oxidize the organic constituents therein. The wet oxidation reactor is divided into upper and lower reaction zones with preheated pulping liquor and air introduced into the lower zone where the bulk of the oxidation occurs. The oxidation mixture moves to the top of the upper zone where offgases are vented and the liquor travels downward encountering additional air introduced at the bottom of the upper zone. The highly oxidized liquor exits near the bottom of the upper zone.

Tagashira, U.S. Pat. No. 4,070,281 discloses the wet oxidation of cyanogen containing waste using a combination of copper and ammonium salts. Some post wet oxidation treatment is required to remove residual cyanide in the wet oxidation waste. No specific continuous flow scheme is mentioned.

Barr in U.S. Pat. No. 4,108,680 discloses a process for removing calcium oxalate scale from metal surfaces using a mixture of dilute nitric acid and manganese dioxide.

Pradt et al. in U.S. Pat. No. 4,174,280 describes the wet oxdation of liquid or solid combustible materials which are insoluble, immiscible and difficult to suspend in water. Water and air are preheated and introduced into the oxidation reactor. A suspension of waste is also injected directly into the reactor where oxidation occurs. The oxidized effluent and offgases are removed from the reactor through a heat exchanger used to preheat the incoming water and air.

Chowdhury in U.S. Pat. No. 4,350,599 discloses wet oxidation of caustic waste liquor where preheated waste and air or oxygen react to generate carbon dioxide which is used to reduce the corrosive nature of the raw waste.

Okugawa in U.S. Pat. No. 4,402,837 describes a process for heat treatment of nickel cyanide waste with caustic and steam using conventional heat exchangers and a horizontal reactor with one outlet for treated liquid and another for ammonia and steam removal.

Horak et al. in U.S. Pat. No. 4,525,283 describes a catalytic wet oxidation of waste at acid pH. A series of wet oxidation reactors is shown where preheated waste and oxygen gas enter the bottom of the reactors and the top of the reactors is provided with an effluent overflow line plus gas transfer, gas circulating and waste gas pipes.

The present invention provides a process for the continuous wet air oxidation of caustic cyanide and metal wastes which provides for uninterrupted waste treatment. The problem of excessive scaling is overcome resulting in the continuous production of an effluent with only trace amounts of cyanide remaining therein.

SUMMARY OF THE INVENTION

The process provided by the invention is effective for continuously treating caustic cyanide and metal waste by wet air oxidation to effect a high degree of cyanide destruction. In this process raw cyanide waste is introduced by a first inlet conduit directly into a wet air oxidation reactor without heating the raw waste. A mixture of preheated pressurized oxygen containing gas and preheated dilution water is introduced by a second inlet conduit into the reactor wherein wet oxidation occurs. The waste, dilution water and gas mix within the reactor and are maintained therein at an elevated temperature and pressure for a sufficient time to destroy the cyanide. The reactor temperature is maintained between about 200° C. (392° F.) and 370° C. (698° F.) while the reactor pressure is maintained between about 300 psig (2,068 KPa) and 3,500 psig (24,129 KPa). Preferrably the reactor temperature is maintained between about 200° C. (392° F.) and 300° C. (572° F.) and the pressure is maintained between about 300 psig (2,068 KPa) and 2,000 psig (13,788 KPa).

The reactor, a vertical bubble column type, is fitted with a pair of valved effluent lines and corresponding valved lines for introducing dilute mineral acid into each effluent line at system pressure. Initially oxidized effluent and offgases exit the reactor through a first effluent conduit while dilute mineral acid flows through a second effluent conduit into the reactor to prevent scale buildup therein. After a period of operation the valves are adjusted to allow oxidized effluent and offgases to exit the reactor through the second effluent conduit and dilute mineral acid to flow through the first effluent conduit and into the reactor to remove scale or solids therein. The oxidized effluent and offgases are cooled and separated. This mode of operation provides for uninterrupted treatment, overcoming the problem of scale formation by the waste within the wet oxidation system.

DESCRIPTION OF THE PREFERRED EMBODIMENTS

The caustic cyanide and metals containing wastewater treated by the process invention contained high concentrations of cyanide, metals and soluble salts resulting in high total solids for the waste. Analyses of the raw waste (Table 1) showed a Chemical Oxygen Demand (COD) of about 23 g/l, a cyanide content of 34 g/l, copper present at 14 g/l and sodium carbonate at about 340 g/l.

Figure 1:
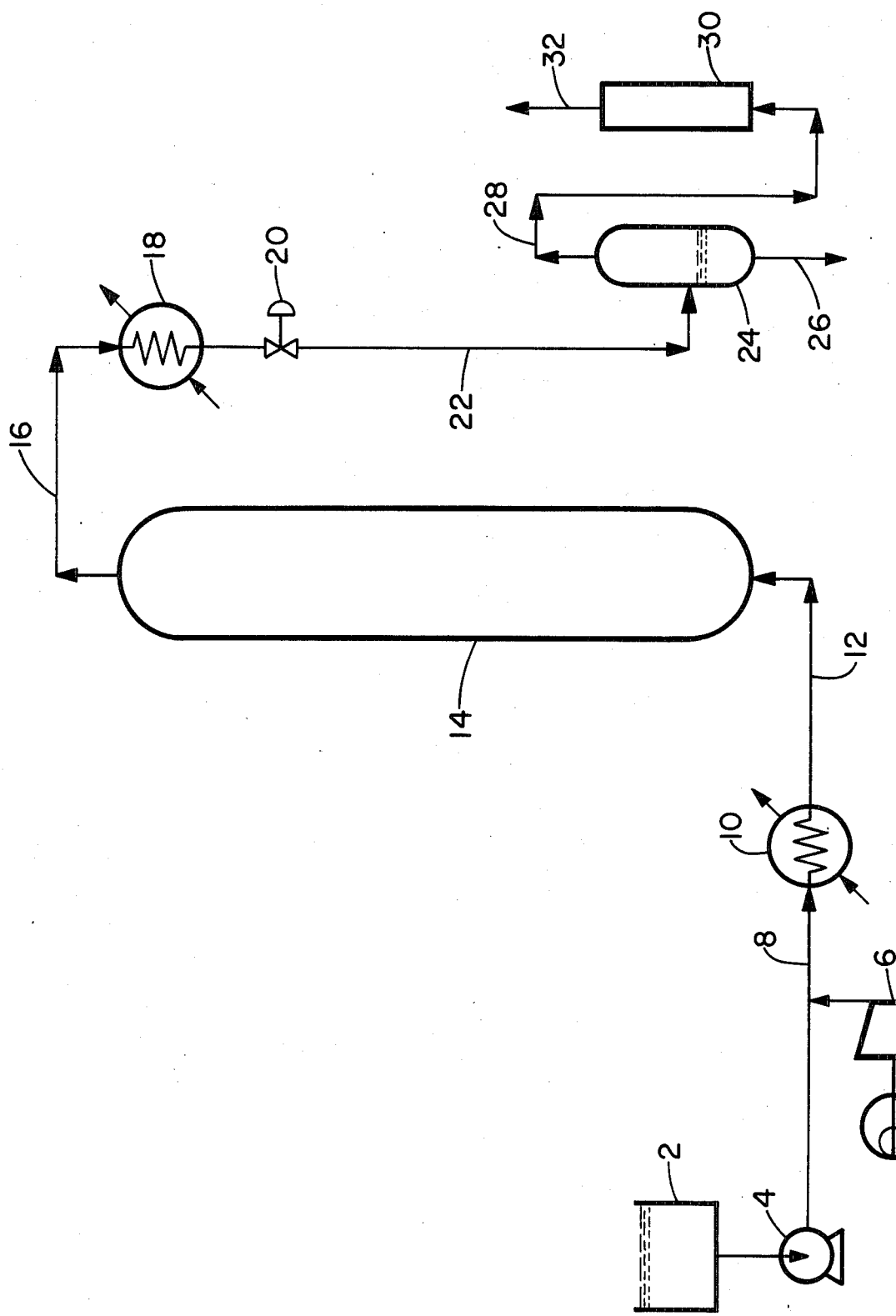
FIG. 1 is a conventional wet air oxidation schematic flow diagram.

Referring to FIG. 1, a conventional wet oxidation flow scheme, the raw waste was diluted with an equal volume of water and placed in a raw waste feed tank 2. The dilute raw waste was brought to system pressure by a high pressure pump 4 and mixed with pressurized air from a compressor 6 in a feed conduit 8. The waste/air mixture was heated to operating temperature by a heater heat exchanger 10 and delivered by a conduit 12 to the lower portion of a wet oxidation reactor 14, a vertical bubble column type, wherein oxidation occurred.

The wet oxidation system operated at 5.5 gal/hr. flow of diluted waste and 1.13 standard cubic feet/minute (SCFM) compressed air, sufficient to oxidize all cyanide in the waste. The reactor temperature was 280° C. (536° F.) and 11,720 KPa (1700 psig) pressure. The above flow rate gave a one hour reactor residence time for the heated pressurized waste.

The oxidized waste effluent and offgases exited the reactor 14 by an effluent conduit 16 and were cooled by a cooler heat exchanger 18. The cooled effluent/offgases mixture passed through a pressure control valve 20 and flowed through a conduit 22 to a gas/liquid separator 24. Oxidized effluent exited the separator by a conduit 26 while offgases were routed through a conduit 28 to a caustic scrubber 30 which collected any cyanide carried through the system by the offgases. The scrubbed offgases exited the system by a vent conduit 32.

When operated in the above described flow scheme, diluted raw waste plugged the heater heat exchanger 10 with solids after 2 hours, causing process shutdown.

Figure 2:
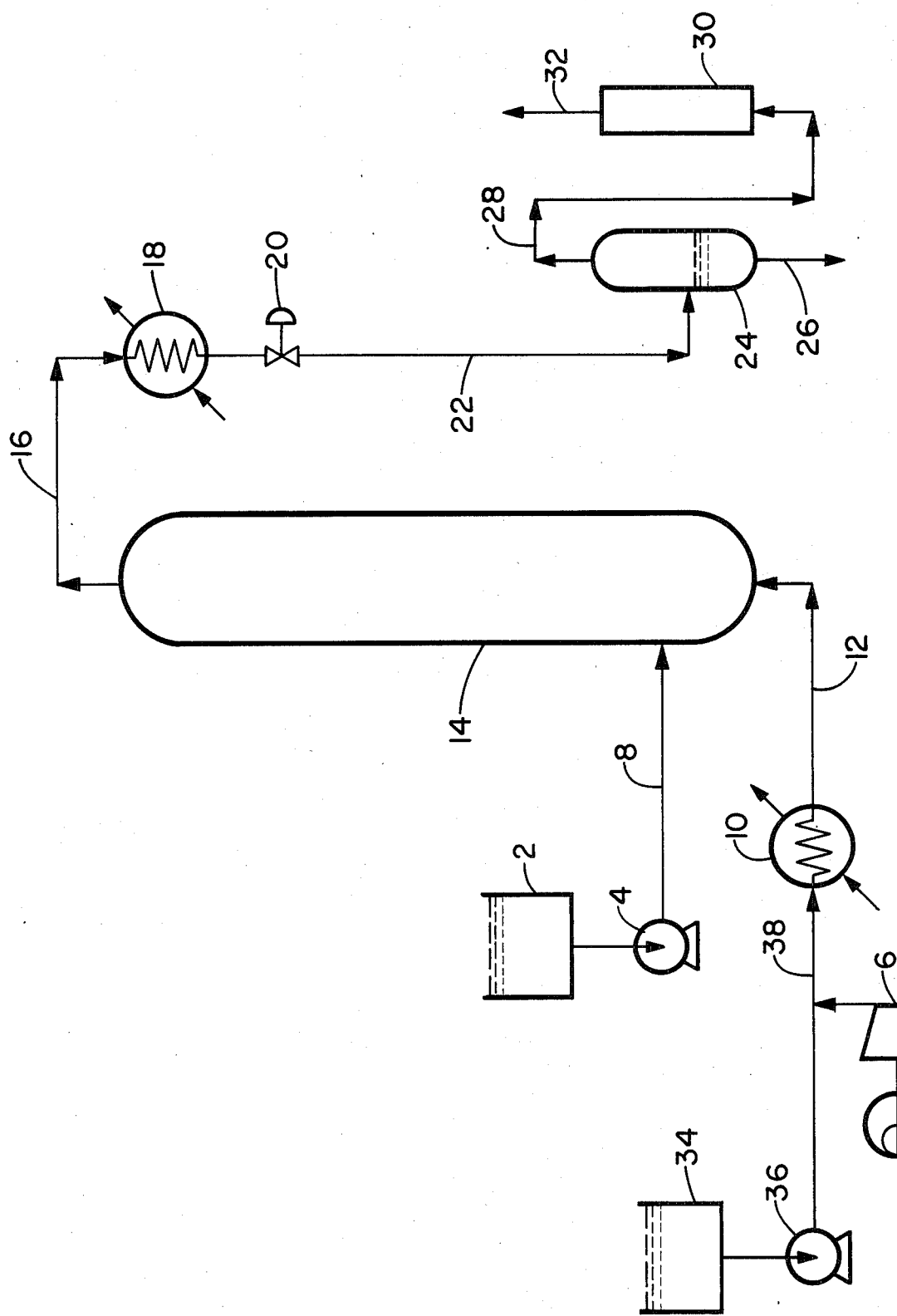
FIG. 2 is a schematic flow diagram showing an alternative prior art process taught by Pradt U.S. Pat. No. 4,174,280.

The waste feed portion of the system was modified as shown in FIG. 2. This flow scheme has been applied to the wet oxidation of wastes which are insoluble, immiscible and difficult to suspend in water. Undiluted raw waste in the feed tank 2 was delivered by a high pressure pump 4 and an inlet feed conduit 8 directly to the lower portion of the wet oxidation reactor 14 without heating the raw waste. An equal volumetric flow of dilution water from a tank 34 flowed to a high pressure pump 36 where it was brought to system pressure and mixed with compressed air from the compressor 6 in a conduit 38. The water/air mixture was heated to operating temperature by the heater heat exchanger 10 and delivered by the conduit 12 to the lower portion of the wet oxidation reactor 14.

The liquid flows were 2.75 gal/hr. each for raw waste and dilution water and 1.13 SCFM for the compressed air. The reactor temperature was 280° C. (536° F.) and 11,720 KPa (1700 psig) pressure with a one hour liquid residence as in FIG. 1. The remaining downstream portion of the oxidation system from effluent conduit 16 operated as described for FIG. 1.

When operated in the flow scheme of FIG. 2, no plugging of feed lines was encountered. However, the reactor top and the effluent conduit 16 plugged after five hours operation causing process shutdown.

After removing the plug by mineral acid washing, the wet oxidation system was operated in the FIG. 2 flow scheme at 204° C. (400° F.) with all other operating parameters the same as described for FIG. 2. After eight hours of operation at the lower temperature the reactor top and the effluent conduit 16 again plugged causing process shutdown.

Figure 3:
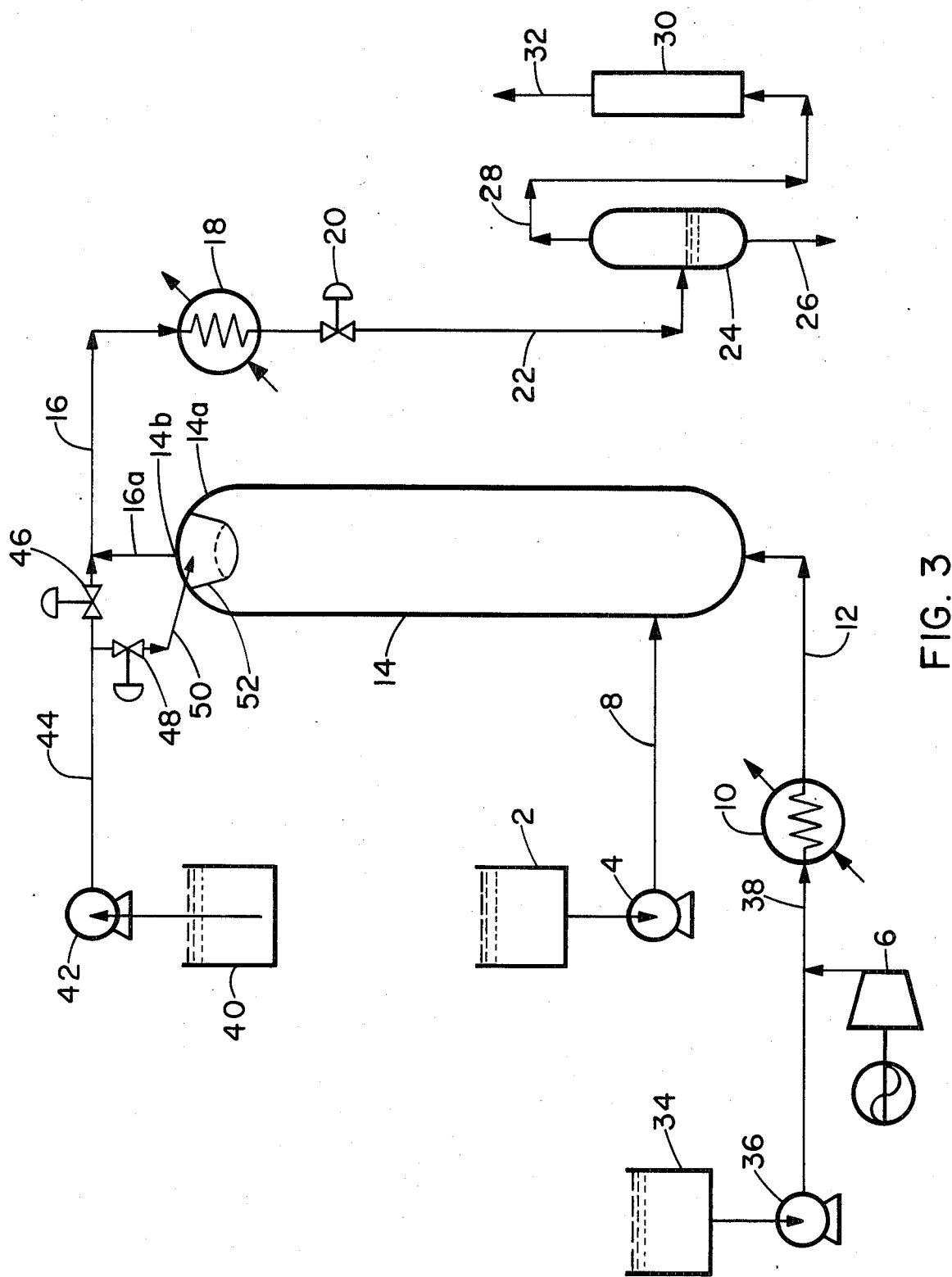
FIG. 3 is a schematic flow diagram showing an acid wash of reactor effluent configuration which failed to prevent plugging.

The effluent conduit system at the top of the wet oxidation reactor was modified as shown in FIG. 3 to allow addition of dilute mineral acid to the top of the reactor 14a and to the effluent conduit 16 to control scale formation therein.

The raw waste feed and dilution water/air feed to the reactor 14 were operated as described in FIG. 2. A solution of dilute mineral acid from acid supply tank 40 was brought to system pressure by a high pressure pump 42 and delivered by an acid conduit 44 through a block valve 46 to effluent conduit 16 to control scale formation therein. Additional dilute acid was added to the top of the reactor 14a, through a block valve 48 and a conduit 50, to control scale formation at the reactor outlet 14b to the effluent conduit 16. A small open-ended section of piping 52 was attached over the reactor outlet 14b to contain the dilute acid supplied thereto in close proximity to the reactor outlet 14b during operation. The remaining downstream portion of the oxidation system from the effluent conduit 16 operated as described for FIG. 1.

The wet oxidation system of FIG. 3 was operated at 232° C. (450° F.) and 11,720 KPa (1700 psig) with a one hour liquid residence in the reactor as described previously. Dilution water and raw waste volumetric flows were each 2.75 gal/hr. and air was added at 1.13 SCFM. A solutiion of 18% nitric acid was added at reactor pressure to the effluent conduit 16 and to the volume within the pipe section 52 near the reactor outlet 14b. The total dilute mineral acid flow rate was 0.5 gal/hr. during operation.

When operated with the flow scheme of FIG. 3, the effluent line 16a close to the reactor and reactor outlet 14b were plugged with scale after five hours, causing system shutdown.

Figure 4:
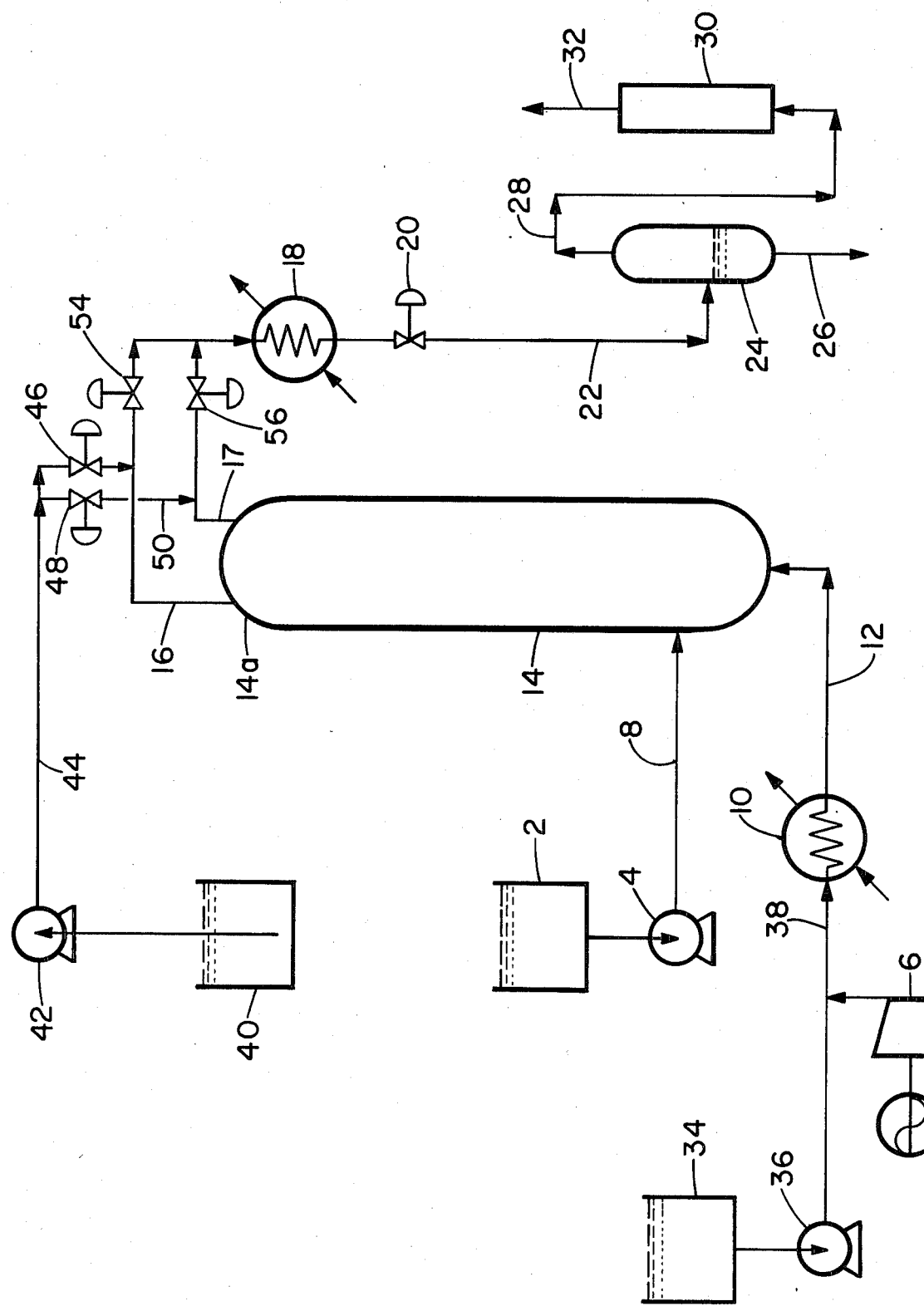
FIG. 4 is a schematic flow diagram showing the acid wash of reactor effluent configuration which allowed uninterrupted system operation.

The effluent conduit system at the top of the wet oxidation reactor was modified as shown in FIG. 4 to allow addition of dilute mineral acid to each of a pair of parallel effluent lines during system operation. FIG. 4 flow scheme shows the process of instant invention.

The raw waste feed and dilution water/air feed to the reactor 14, a vertical bubble column type, were operated as described in FIG. 2. Two parallel effluent conduits, 16 and 17, connected the reactor top 14a with cooler heat exchanger 18. The conduits 16 and 17 each contained a block valve, 54 and 56, respectively. Dilute mineral acid from acid tank 40 was brought to system pressure by the pump 42 and the conduit 44 supplied dilute mineral acid through block valve 46 to the effluent conduit 16 at a point between the reactor 14 and the block valve 54. Likewise block valve 48 and conduit 50 supplied dilute mineral acid to the effluent conduit 17 at a point between the reactor 14 and the block valve 56. The remaining downstream portion of the oxidation system from cooler heat exchanger 18 operated as described for FIG. 1.

During system operation oxidized effluent and offgases from the reactor 14 exited by first effluent conduit 16 with the valve 54 open. The valve 46 in the acid line 44 was closed to prevent acid flow into said first conduit 16. At the same time valve 56 was closed in second effluent conduit 17 to prevent effluent flow therethrough, and the acid control valve 48 was opened to supply dilute mineral acid to the second effluent conduit 17 and the reactor top 14a which prevented scale formation therein.

After a specified period of operation, the effluent valve 54 was closed and effluent valve 56 was opened to allow effluent and offgases to exit the reactor 14 through second effluent conduit 17. Simultaneously acid control valve 48 was closed and acid control valve 46 was opened which allowed dilute mineral acid to flow through conduit 16 into the reactor top 14a which removed scale therefrom. Oxidized effluent and offgases were cooled in cooler heat exchanger 18 as was described in FIG. 1.

For economical system operation the heater heat exchanger 10 and the cooler heat exchanger 18 are combined such that incoming dilution water and oxygen containing gas, preferrably air, are heated by oxidized effluent and offgases which, in turn, are cooled before separation.

The wet oxidation system of FIG. 4 was operated at 232° C. (450° F.) and 11,720 KPa (1700 psig) with a 1 hr. liquid residence time as previously described. Likewise, dilute mineral acid flow of 18% nitric acid was 0.5 gal/hr from pump 42. The flows of oxidized effluent plus offgases and the dilute acid solution were alternated between conduits 16 and 17 every three hours as described above. This resulted in thirty hours of uninterrupted operation. The time period between alternating the flows between conduits 16 and 17 may be as often as every two hours or as long as every four hours. The concentration of dilute nitric acid employed may be as low as 5% to as high as 20%, depending on the caustic content of the particular waste treated. Analysis of the oxidized effluent shown in Table 1 demonstrated a high degree of cyanide destruction for the invention process.

The wet oxidation reactor was opened after the thirty hours of operation. The reactor wall had an adhering scale deposit while a loose, sand-like deposit was found at the bottom of the reactor. Each solid was analyzed for cyanide, metals and ash. The results in Table 2 show the wall scale was mainly sodium, copper, phosphorus and carbonate while the loose scale contained mainly copper, zinc, sodium, phosphorus and carbonate. Cyanide content in each was negligible. Both deposits dissolved readily in dilute mineral acid. These solids account for the apparent removal of copper and zinc from the waste during wet oxidation as seen in Table 1.

TABLE 1

| Analyses of Raw and Wet Oxidized Caustic Cyanide Metal Waste | | |
|---|---|---|
| Parameter | Raw Waste | Oxidized Waste |
| COD, g/l | 23.2 | 2.54 |
| Cyanide, mg/l | 34,300 | 1.57 |
| Copper, g/l | 14.4 | 1.0 |
| Zinc, g/l | 4.0 | 0.005 |
| Sodium, g/l | 177.3 | 67.8 |
| $CO_2$, g/l | 120.7 | 42.4 |
| T. Solids, g/l | 434.7 | 185. |

TABLE 1-continued

| Analyses of Raw and Wet Oxidized Caustic Cyanide Metal Waste | | |
|---|---|---|
| Parameter | Raw Waste | Oxidized Waste |
| T. Ash, g/l | 420.3 | — |
| pH | 10.65 | 9.7 |

TABLE 2

| Analyses of Reactor Solids | | |
|---|---|---|
| Parameter | Wall Scale | Loose Scale |
| Cyanide, µg/g | 3.8 | 0.9 |
| $CO_2$, % | 8.9 | 4.3 |
| Phosphorus, % | 7.4 | 5.7 |
| Sodium, % | 21.8 | 16.4 |
| Copper, % | 24.1 | 15.6 |
| Zinc, % | 4.1 | 19.2 |
| Iron, % | 0.7 | 2.1 |
| Ash @ 600° C., % | 86.2 | 90.4 |

We claim:

1. In a process for treating by wet oxidation a caustic cyanide and metal wastewater showing a potential to form scale upon heating, wherein said raw wastewater is introduced by a first inlet conduit into a pressurized wet oxidation reactor without preheating, and wherein a preheated mixture of oxygen containing gas and dilution water is introduced by a second inlet conduit into said reactor, and wherein said wastewater, dilution water and oxygen containing gas are maintained within said reactor at an elevated temperature and pressure for sufficient time to destroy cyanide and produce an oxidized waste effluent and an oxygen depleted offgas which are removed from said reactor, wherein the improvement comprises the steps;

(a) discharging said oxidized effluent and offgas from said reactor through a first effluent conduit while at the same time introducing a dilute mineral acid solution into said reactor through a second effluent conduit to prevent scale and solids buildup therein; and (b) alternating the flow of oxidized effluent and offgas and dilute mineral acid whereby oxidized effluent and offgas discharge from the reactor through said second effluent conduit and dilute mineral acid solution enters the reactor through said first effluent conduit to remove scale and solids therefrom.

2. A process according to claim 1 further comprising the steps;

(c) cooling said oxidized effluent and offgases by cooling means; and (d) separating said cooled oxidized effluent from said offgases by separating means to produce a separated liquid phase and a separated gas phase.

3. A process according to claim 2 wherein said cooling means of step (c) is a cold water heat exchanger.

4. A process according to claim 2 wherein said cooling means of step (c) is a heat exchanger which preheats said mixture of dilution water and oxygen containing gas introduced into said reactor.

5. A process according to claim 1 wherein said dilution water and oxygen containing gas are preheated by an external heat source.

6. A process according to claim 1 wherein said dilute mineral acid of steps (a) and (b) is nitric acid.

7. A process according to claim 6 wherein said dilute nitric acid is at a concentration of 5% to 20%.

8. A process according to claim 1 wherein said elevated temperature is between about 200° C. (392° F.) and 370° C. (698° F.) and said elevated pressure is between about 300 psig (2,068 KPa) and 3500 psig (24,129 KPa).

9. A process according to claim 1 wherein said elevated temperature is between about 200° C. (392° F.) and 300° C. (572° F.) and said elevated pressure is between about 300 psig (2,068 KPa) and 2000 psig (13,788 KPa).

10. A process according to claim 1 wherein said wet oxidation reactor is a vertical bubble column.

11. A process according to claim 1 wherein said oxygen containing gas is air.

12. A process according to claim 1 wherein said alternating step (b) is performed after two hours to four hours of system operation.

13. In a process for treating by wet oxidation a caustic cyanide and metal wastewater showing a potential to form scale upon heating, wherein said raw wastewater is introduced by a first inlet conduit into a pressurized wet oxidation reactor without preheating, and wherein a preheated mixture of oxygen containing gas and dilution water is introduced by a second inlet conduit into said reactor, and wherein said wastewater, dilution water and oxygemn containing gas are maintained within said reactor at an elevated temperature and pressure for sufficient time to destroy cyanide and produce an oxidized waste effluent and an oxygen depleted offgas which are removed from said reactor, wherein the improvement comprises the steps;

(a) discharging said oxidized effluent and offgas from said reactor through a first effluent conduit while at the same time introducing a dilute mineral acid solution into said reactor through a second effluent conduit to prevent scale and solids buildup therein;

(b) alternating the flow of oxidized effluent and offgas and dilute mineral acid whereby oxidized effluent and offgas discharge from the reactor through said second effluent conduit and dilute mineral acid solution enters the reactor through said first effluent conduit to remove scale and solids therefrom;

(c) cooling said oxidized effluent and offgases by cooling means; and (d) separating said cooled oxidized effluent from said offgases by separating means to produce a separated liquid phase and a separated gas phase.

* * * * *